United States Patent
Subramanian et al.

(10) Patent No.: US 8,938,717 B1
(45) Date of Patent: Jan. 20, 2015

(54) UPDATING AN INSTALLED COMPUTER PROGRAM

(75) Inventors: Krishnan Subramanian, San Jose, CA (US); Arun K. Mandhania, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 1429 days.

(21) Appl. No.: 12/405,196

(22) Filed: Mar. 16, 2009

(51) Int. Cl.
*G06F 9/44* (2006.01)

(52) U.S. Cl.
USPC ............... 717/123; 717/120; 717/168

(58) Field of Classification Search
CPC ............... G06F 17/30011; G06F 17/30634; G06F 8/73
See application file for complete search history.

(56) References Cited

U.S. PATENT DOCUMENTS

| | | | | |
|---|---|---|---|---|
| 4,860,203 A * | 8/1989 | Corrigan et al. | ............... | 717/123 |
| 5,307,493 A * | 4/1994 | Gusenius | ...................... | 717/123 |
| 5,408,667 A * | 4/1995 | Brodie et al. | .................. | 717/106 |
| 5,418,942 A * | 5/1995 | Krawchuk et al. | ................. | 1/1 |
| 5,452,206 A * | 9/1995 | Turrietta et al. | ............... | 715/236 |
| 5,655,119 A * | 8/1997 | Davy | ................................... | 1/1 |
| 5,815,717 A * | 9/1998 | Stack | ............................ | 717/105 |
| 5,963,940 A * | 10/1999 | Liddy et al. | ............................. | 1/1 |
| 5,987,251 A * | 11/1999 | Crockett et al. | ............... | 717/123 |
| 6,167,397 A * | 12/2000 | Jacobson et al. | ....................... | 1/1 |
| 6,257,774 B1 * | 7/2001 | Stack | ............................ | 717/123 |
| 6,662,357 B1 * | 12/2003 | Bowman-Amuah | ........... | 717/120 |
| 6,839,879 B1 * | 1/2005 | Hwang | .......................... | 715/256 |
| 7,127,675 B1 * | 10/2006 | Kates et al. | .................... | 715/705 |
| 7,318,068 B2 * | 1/2008 | Locke et al. | ............................ | 1/1 |
| 7,386,801 B1 * | 6/2008 | Horvitz et al. | ................. | 715/764 |
| 7,475,293 B1 * | 1/2009 | Little et al. | ........................ | 714/48 |
| 7,478,381 B2 * | 1/2009 | Roberts et al. | ................. | 717/168 |
| 7,496,910 B2 * | 2/2009 | Voskuil | ........................... | 717/168 |
| 7,503,041 B2 * | 3/2009 | Butterweck et al. | ........... | 717/168 |
| 7,506,257 B1 * | 3/2009 | Chavez et al. | ................. | 715/714 |
| 7,562,356 B2 * | 7/2009 | DeFolo | ........................... | 717/169 |
| 7,568,184 B1 * | 7/2009 | Roth | ............................... | 717/123 |
| 7,827,546 B1 * | 11/2010 | Jones et al. | .................... | 717/173 |
| 2002/0087944 A1 * | 7/2002 | David | ............................ | 717/100 |
| 2003/0105746 A1 * | 6/2003 | Stickler | .............................. | 707/3 |
| 2004/0015938 A1 * | 1/2004 | Taylor | ............................. | 717/168 |
| 2004/0088698 A1 * | 5/2004 | Claiborne | ...................... | 717/168 |

(Continued)

OTHER PUBLICATIONS

"DBScribe 1.4 for SQL Server Product summary", LEADUM Software, 2007, <http://www.leadum.com/product.php?prod_id=17>, p. 1.*

(Continued)

*Primary Examiner* — Thuy Dao
*Assistant Examiner* — Samuel Hayim
(74) *Attorney, Agent, or Firm* — Kevin T. Cuenot (57) ABSTRACT

A computer-implemented method of updating an installed computer program can include receiving a user input specifying a query against help documents of a documentation system of the installed computer program and executing the query against the help documents. Responsive to determining a query result, usage information for the documentation system can be stored within computer memory of a computer system. The usage information can include at least one entry, wherein the entry includes at least a portion of the query and the query result, thereby specifying an association between the query and the query result. The usage information can be automatically sent to a remote computer system affiliated with a provider of the installed computer program.

16 Claims, 4 Drawing Sheets

(56) References Cited

U.S. PATENT DOCUMENTS

| | | | |
|---|---|---|---|
| 2004/0172612 A1* | 9/2004 | Kasravi et al. | 717/120 |
| 2004/0205709 A1* | 10/2004 | Hiltgen et al. | 717/115 |
| 2004/0243978 A1* | 12/2004 | Walmsley | 717/120 |
| 2005/0076325 A1* | 4/2005 | Bergin et al. | 717/100 |
| 2005/0102664 A1* | 5/2005 | Eyres et al. | 717/168 |
| 2005/0149921 A1* | 7/2005 | Rollins | 717/168 |
| 2005/0257209 A1* | 11/2005 | Adams et al. | 717/168 |
| 2006/0020643 A1* | 1/2006 | Locke et al. | 707/204 |
| 2006/0031827 A1* | 2/2006 | Barfield et al. | 717/168 |
| 2006/0047682 A1* | 3/2006 | Black et al. | 707/102 |
| 2007/0169079 A1* | 7/2007 | Keller et al. | 717/168 |
| 2007/0276877 A1* | 11/2007 | Locke et al. | 707/201 |
| 2009/0064123 A1* | 3/2009 | Ramesh et al. | 717/168 |
| 2009/0182715 A1* | 7/2009 | Falkenberg | 707/3 |
| 2010/0076998 A1* | 3/2010 | Podgorny et al. | 707/772 |
| 2010/0146483 A1* | 6/2010 | Komarov et al. | 717/120 |

OTHER PUBLICATIONS

Joachim Bayer et al., "A View-Based Approach for Improving Software Documentation Practices", IEEE, 2006, <http://ieeexplore.ieee.org/stamp/stamp.jsp?tp=&arnumber=1607376>, pp. 1-10.*

Andrew Forward et al., "The Relevance of Software Documentation, Tools and Technologies: A Survey", ACM, 2002, <http://delivery.acm.org/10.1145/590000/585065/p26-forward.pdf>, pp. 1-8.*

* cited by examiner

UPDATING AN INSTALLED COMPUTER PROGRAM

FIELD OF THE INVENTION

The embodiments disclosed herein relate to updating an installed computer program. More particularly, the embodiments relate to updating an installed computer program according to documentation system usage information.

BACKGROUND

When a modern computer program (program) is installed on a computer, documentation describing how to use that program is also typically installed or stored on the computer. A user may access that documentation to learn how to use the program or to find answers or explanations to more specific and targeted questions about particular functions of the program. In most cases, the program provides a user interface through which the user may view and interact with the documentation. This may be, for example, a separate program, or a module of the installed program, that facilitates searching via keyword, an index, or the like.

The complexity of modern programs usually translates into a large amount of supporting documentation for that program. Locating information of interest within that documentation may not be an intuitive process for any of a variety of reasons. Poor quality documentation may result in user dissatisfaction and frustration with the program.

SUMMARY

The embodiments disclosed within this specification relate to collecting usage information for documentation of an installed computer program and updating the computer program. One embodiment of the present invention can include a computer-implemented method of updating an installed computer program. The method can include receiving a user input specifying a query against help documents of a documentation system of the installed computer program and executing the query against the help documents. Responsive to determining a query result, usage information for the documentation system can be stored within computer memory of a computer system. The usage information can include at least one entry, wherein the query includes at least a portion of the query and the query result, thereby specifying an association between the query and the query result. The usage information can be automatically sent to a remote computer system affiliated with a provider of the installed computer program.

The method can include receiving the usage information within the remote computer system and distributing an update, created at least in part according to the usage information. Storing the usage information can include storing an indication of each help document of the query result that is selected by the user. The method also can include determining an operational context of the installed computer program responsive to a user input specifying a query to be executed against the help documents and storing the operational context of the installed computer program as part of the entry within the usage information.

In one aspect, the query can be formatted in a first language and the query result can be formatted in a second language. Accordingly, the method can include correlating terms of the query in the first language to at least one help document formatted in the second language that is returned as the query result. In another aspect, the method can include automatically combining at least two help documents when the usage information indicates that the at least two help documents were accessed within a predetermined amount of time of one another.

The method can include identifying a search term of a query, wherein the search term is not included within the help documents. The search term can be selected. The method also can include creating an alias that associates the selected search term with a term that is included within one or more of the help documents. In another aspect, the method can include selecting a search term from a query that yields a query result that includes no help documents and creating an alias that associates the selected search term with a term that exists within one or more of the help documents of the documentation system. In another aspect, an alias specifying the selected search term can be created that associates the selected search term with one or more of the help documents of the documentation system.

Another embodiment of the present invention can include a computer-implemented method of updating an installed computer program including receiving a plurality of user queries to be executed against a documentation system of the installed computer program and, for each user query, determining an operational context of the installed computer program. Each of the plurality of queries can be executed against the documentation system. Entries can be stored within memory of a computer system. Each entry can include at least a portion of a user query a query result for each query and the operational context associated with each query. Each entry can be sent to a remote computer system affiliated with a provider of the installed computer program.

The method can include receiving the entries within the remote computer system and distributing an update, created at least in part according to the entries. Storing the entries can include storing an indication of each help document, of at least one query result, that is selected by the user.

Yet another embodiment of the present invention can include a computer-program product including a computer-usable medium having computer-usable program code that, when executed by a computer system, causes the computer system to perform the various steps and/or functions disclosed herein.

DETAILED DESCRIPTION OF THE DRAWINGS

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Collecting information relating to the usage of computer program (program) documentation can be difficult, particularly when that documentation is installed on a user's computer, e.g., "on the desktop." From time to time, users may report instances where the documentation of a program was not helpful. The particular circumstances, however, in which the user sought the help and the manner in which the help was sought may be forgotten or only minimally recalled if even reported. This provides software developers with little guidance as to how to improve the documentation of the program. The lack of detail in user provided feedback makes improving the documentation difficult. Further, user feedback may be obtained infrequently, if at all.

The embodiments disclosed within this specification provide a technique for continuously collecting usage information for documentation of an installed program. The collected usage information can be provided to the entity that provides the program, e.g., a developer or other entity responsible for maintaining the program and/or documentation, referred to herein as the "provider" of the program.

A program can be installed for use on a computer along with documentation for that computer. User queries directed at the documentation can be stored on the computer in association with any query results obtained from each respective query of the documentation. Other information may also be stored in association with each query. The collected usage information, e.g., queries and query results, can be sent electronically from the computer within which the program has been installed to a different computer that is associated with the provider of the program. This allows the provider to review the manner in which users utilize the documentation supporting the program and continuously improve the documentation.

Figure 1:
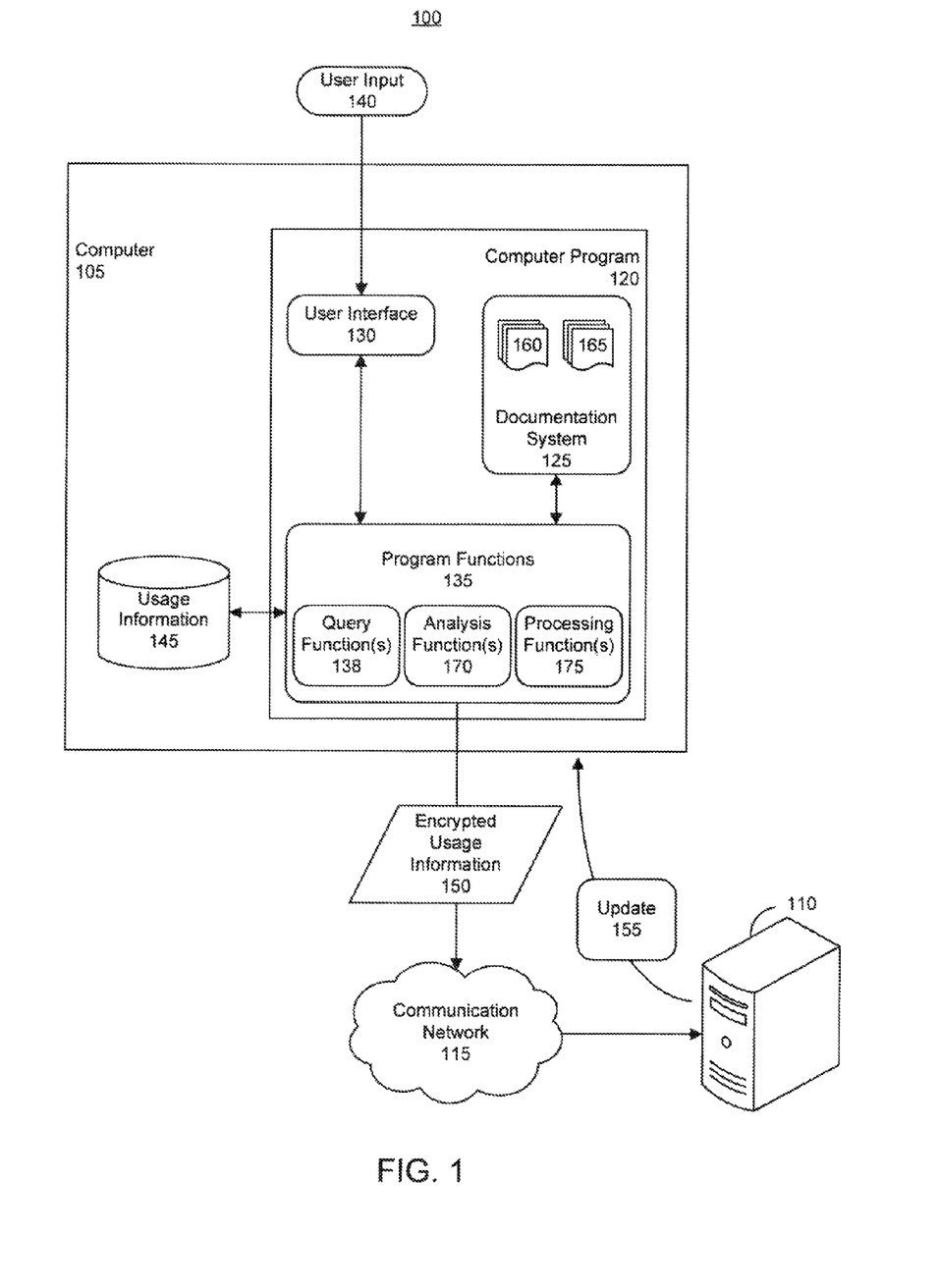
FIG. 1 is a block diagram illustrating a system for updating an installed computer program in accordance with one embodiment of the present invention.

FIG. 1 is a block diagram illustrating a system 100 for updating an installed program in accordance with one embodiment of the present invention. System 100 can include a computer 105 and a computer 110, each being communicatively linked or coupled through a communication network 115.

As used herein, a "computer" can refer to a data processing system or a computer system. A computer that is suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices such as, for example, keyboards, displays, pointing devices, etc., can be coupled to the computer either directly or through intervening I/O controllers. Network adapters may also be coupled to the computer to enable the computer to become coupled to other computers, devices, or remote printers or storage devices through intervening private or public networks. Modems, cable modems, and Ethernet cards are just a few of the currently available types of network adapters.

Computer 105 can be implemented as a user computer system, e.g., a workstation, laptop, or the like. Computer 110 can be implemented as a server. It should be appreciated, however, that these examples are offered for purposes of illustration and, as such, are not intended to limit the embodiments disclosed within this specification.

Communication network 115 can be implemented as, or include, without limitation, a wide area network (WAN), a local area network (LAN), the Public Switched Telephone Network (PSTN), a cable network, the Web, the Internet, and/or one or more intranets. Communication network 115 further can be implemented as or include one or more wireless networks, whether short or long range, e.g., satellite based networks, mobile networks, and/or 802.11 type networks.

As shown, computer 105 can include a program 120, which has been installed on computer 105. As part of program 120, documentation system 125 has been installed on computer 105. Accordingly, program 120 and documentation system 125 both, in whole or in part, at any given time, may be stored within bulk storage of computer 105 and/or within local memory to facilitate execution of program 120 and access to documentation system 125.

Documentation system 125 can include one or more files, e.g., help documents 160, that include textual content, graphic content, audio content, video content, multimedia content, and/or other modes of content that explain how to utilize program 120. For example, help documents 160 may be implemented as a collection of hypertext markup language documents, a collection of text documents, one or more portable document format files, one or more media files, one or more documents including bookmarks or other location markers, or the like. Typically, help documents 160 will be annotated or organized into a variety of different subjects and/or classifications to facilitate user searching, whether by accessing a table of contents, an index, or keyword searching against the entirety of help documents 160 or metadata, for example, associated with help documents 160.

Help documents 160 also may be organized with different portions, whether a plurality of documents, a single document, or a portion of a single document, being associated with specific operational contexts or states of program 120. This allows specific portions of help documents 160 to be loaded and/or displayed responsive to a user input requesting access to documentation system 125 based upon the operational context, e.g., the current operational context, of program 120 at the time the user input requesting access is received.

Documentation system 125 further can include associations or mappings between various terms not found within help documents 160 and terms that are found within help documents 160. As used herein, a "term" can refer to any combination of alphanumeric symbols, words, phrases, or the like. A term not found within help documents 160 can be informally added to documentation system 125 in the form of an alias. Each alias can specify a mapping of a term not found within help documents 160 to one or more terms that do exist within, or are associated with terms that exist within, help documents 160. The terms associated with one another by an alias, though different, may be synonymous or have similar meaning. In this manner, terms may not actually be added to help documents 160, e.g., help content of documentation system 125, but rather added as an alias that points to, or indicates, other terms that do exist within help documents 160 or point to particular help documents 160 or portions thereof.

Documentation system 125 can include, for example, one or more alias files 165, each specifying one or more aliases. Including alias file(s) 165 within documentation system 125 effectively allows various terms not found within help documents 160, such as trade names for particular products, functions, or processes of providers of products other than program 120, to be associated with or mapped to terms utilized by the provider of program 120 that exist within help documents 160.

Program 120 can include a user interface 130, whether a graphical user interface (GUI) or another type of user interface, e.g., command line or the like. Program 120 also can include one or more program functions 135, e.g., modules, that implement the program logic or functionality.

It should be appreciated that while documentation system 125 is pictured as being within, or part of, program 120, documentation system 125, as well as any functions and/or interfaces necessary for accessing documentation system 125, e.g., searching, querying, etc., may exist in the form of a program that is separate from, and independent of, program 120, but which is able to work in cooperation with program 120. The particular configuration, e.g., whether documentation system 125 and supporting query functionality is incorporated within program 120 or exists independently of program 120, is not intended as a limitation of the embodiments disclosed within this specification.

In operation, program 120 and documentation system 125 can be installed on computer 105. Program 120 then can be executed. During operation of program 120, user input 140 may be received. For example, a user input requesting context sensitive help may be received. Alternatively, a general request for help or access to documentation system 125 may be received. User input 140 may be received through the user interface 130 of program 120 and can be processed by a one or more query function(s) 138 of the program functions 135. The query function(s) 138 can be responsible for handling help or documentation system 125 access requests.

Help documents 160, or portions thereof, can be presented to the user, typically through a display device. In the case of context sensitive help, a particular help document selected from help documents 160 that has been associated with the current operational context of program 120 can be identified and displayed. Further, one or more additional user inputs may be received that specify a query or search to be performed against help documents 160. For example, a query function 138 within the program functions 135 may receive the user specified query and execute the query against help documents 160.

In one embodiment, the query function(s) 138 of program 120 can parse the search terms of the query and identify any terms in the query that have been specified within an alias. The query function(s) 138 can replace any identified terms, e.g., terms not found within help documents 160, with the term to which each respective alias has been mapped or associated. Once replacement of terms in the user specified query has been performed as specified by the aliases, the query can be executed against the help documents 160 using the replaced terms. This effectively maps terms used within queries that otherwise would not be found in help documents 160 and likely lead to an empty set query result, e.g., a query result returning no help documents, with other terms of similar or the same meaning that do exist within help documents 160 and that will likely produce useful or desired query results of one or more help documents 160.

Program 120 can store usage information 145 for documentation system 125 within memory of computer 105 or another computer. As used herein, the phrase "usage information" can refer to any information relating to a user access of documentation system 125. For example, usage information 145 can include, but is not limited to, a user query or any portion thereof, a query result, the operational context of program 120 when the query is executed or received or when the user input requesting access to documentation system 125 is received, as well as any help documents 160 returned as part of a query result that may be selected or viewed by the user. The usage information 145 may also include documents or information directly viewed or selected by the user, and not returned as part of a search or query.

For example, each search term or keyword, logical or Boolean connectors, wildcards, etc. can be stored as usage information 145. Freestyle searches, if supported, may also be stored as usage information 145. Usage information 145 can be stored in memory of computer 105, or another communicatively linked computer or data storage system. For example, the usage information 145 may be stored within RAM, e.g., non-persistent memory, or a bulk storage device such as a magnetic or optical drive, e.g., persistent memory.

As noted, the operational context of program 120 can be determined responsive to a user input requesting access to documentation system 125, access to context sensitive help, or submission of a query against help documents 160. The operational context of program 120 can be stored and associated with the query and query result within usage information 145. For example, the usage information 145 can include a plurality of entries wherein each entry is made by the query function(s) 138 and is formed of a user specified query against documentation system 125, a query result, and optionally the operational context of program 120 that is identified when access to documentation system 125 is initially requested by the user or when the query is executed.

In one embodiment, the program 120 can include one or more optional analysis function(s) 170 as part of the program functions 135. The analysis function(s) 170 can perform various processing steps, to be described herein in greater detail, with regard to the usage information 145. Usage information 145 can be processed and forwarded to computer 110 from time to time, periodically, or responsive to particular programmatic events. Usage information 145 also may be manually forwarded to computer 110 by a user of computer 105.

As shown, the program 120 also can include one or more processing function(s) 175 as part of the program functions 135 that can format the usage information 145, including any analysis results from optional analysis function(s) 170, as an electronic document. For example, usage information 145 can be formatted as a text file, an Extensible Markup Language (XML) file, etc. The resulting electronic document optionally can be encrypted into encrypted usage information 150 by processing function(s) 175 prior to sending to computer 110. Once encrypted, encrypted usage information 150 can be electronically sent through communication network 115 to computer 110.

In another embodiment, prior to sending, analysis function 160 can provide users with the opportunity to add additional data regarding their usage experience with the documentation system 125. Any user-provided data can be added to the electronic document that is ultimately output to the computer 110.

Various analysis processes operative within computer 110, or one or more other computers associated with the provider of program 120, can be applied to the usage information once decrypted. It should be appreciated that the various processes applied to the received usage information within computer 110 can be performed in addition to any analysis performed by optional analysis function(s) 160 or in lieu of such processing within computer 105. In any case, the various analysis steps that are described within this specification relating to usage information 145 can be performed within the computer 105, the computer 110, or within a combination of both computers 105 and 110.

After analysis of the usage information 145, an update 155 for program 120 can be created and sent electronically to computer 105. Computer 105 can install update 155, thereby updating any portion of program 120 including documentation system 125. The term "updating," as used within this specification, can refer to deletion of one or more software components, replacing one or more software components with other software components, or adding one or more new software components. For example, update 155, when installed can update documentation system 125 by updating, e.g., replacing, deleting, or adding one or more portions of documentation system 125, e.g., one or more help documents 160, or the entirety of documentation system 125. In another example, installing update 155 can update a particular function or portion of program 120 responsible for facilitating user access to documentation system 125, e.g., replacing, adding, or deleting one or more of functions 135. Installing update 155 also can replace one or more alias files 165 with updated alias files, add one or more alias files, or delete one or more alias files.

In another embodiment, the documentation system 125 can be configured so that a user can query the documentation system 125 in a first language and receive results, e.g., help documents, in response to the query that are formatted or written in a second and different language. In illustration, a user may submit a query to the documentation system 125 in English, and receive results back in Japanese. In such an embodiment, an index of search terms can be maintained in the query language. Each of the search terms can be mapped to, or correlated with, one or more of the help documents in the second language. Similarly, the search terms in the first language can be mapped to the alias files to facilitate further mapping and more complex relationships between search terms in the first language and help documents in the second language.

It should be appreciated that the different components of program 120 can be implemented as one or more separate programs. For example, different ones of the functions 135, the documentation system 125, or portions thereof, can be implemented as separate and individual programs that execute concurrently and/or cooperatively with one another.

Figure 2:
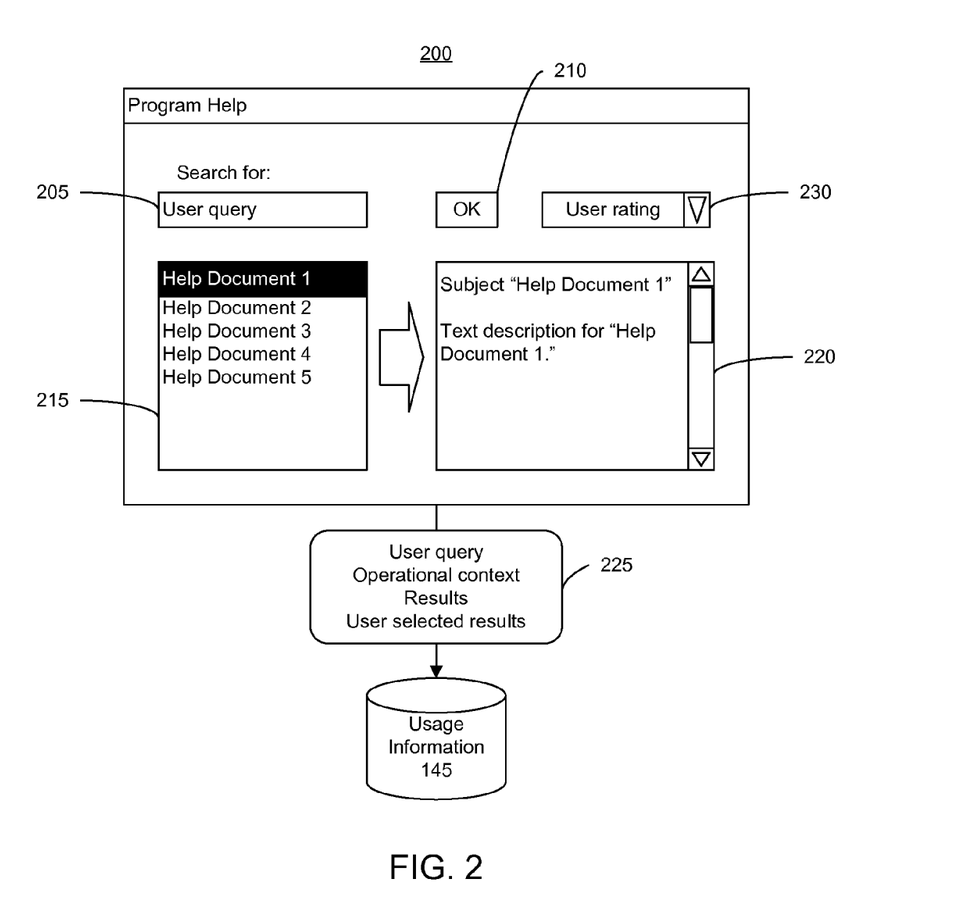
FIG. 2 is a pictorial view illustrating a graphical user interface for accessing a documentation system for an installed computer program that facilitates the storage of usage information in accordance with another embodiment of the present invention.

FIG. 2 is a pictorial view illustrating a graphical user interface (GUI) 200 for accessing documentation for an installed program that facilitates the storing of usage information in accordance with another embodiment of the present invention. GUI 200 can be generated by program 120 of FIG. 1, for example. Accordingly, GUI 200 can be presented responsive to a user input requesting access to the documentation system of the program. In this example, a user query has been received within field 205. The query can be executed responsive to selection of button 210 or activation of the "enter" key, for example.

A query result, in this case a list of Help Documents 1-5, can be presented within window 215. Help Documents 1-5 of the query result represent those portions of the documentation system, e.g., content, that match some portion, or all, of the user query entered in field 205. As pictured, the user has selected "Help Document 1." Responsive to that selection, "Help Document 1" can be presented within window 220.

An entry 225 including the user query, the operational context of the program, the query result, e.g., specifying Help Documents 1-5, and any user selections indicating particular help documents, portions of help documents, e.g., a particular location within a selected help document, of the query result selected by the user for viewing can be stored in the usage information 145. The user selected help documents can indicate which of Help Documents 1-5 were selected by the user for viewing in response to the user query.

For example, if after selecting "Help Document 1," the user then selects "Help Document 3," the user selected results specifying "Help Document 1" and "Help Document 3" can be stored in the usage information 145. Any further user selection of a help document from the query result can be stored until such time that the user terminates the help session or executes a new query that returns a new query result. At that point, e.g., responsive to execution of the new query, a new entry can be created that includes the user specified query, operational context of the program, the query result, and any help documents from the query result that are selected by the user for viewing.

In addition, time stamp information specifying when the user query was executed, when results were provided in response to the query, and when each help document of the query result was selected for viewing can be stored as part of the usage information 145. The time stamp information can be analyzed to identify and correct inefficiencies within the documentation system. For example, using the time stamp of the submitted query and any results that are determined in response to that query, the elapsed time can be analyzed or determined so that improved query and/or delivery mechanisms for the help documents can be created, particularly for frequently accessed information.

In another embodiment, from the usage information 145, those help documents that are frequently accessed in groups can be identified. For example, from an analysis of the usage information 145, it can be determined that when one accesses "Help Document 3," one often, or frequently, also accesses "Help Document 10." This can be determined from the time stamp information, for example, in that each help document may be accessed within a predetermined amount of time of the other with some minimum frequency. To improve the delivery of help documents to the user, "Help Document 3" and "Help Document 10" can be either delivered together in response to a query or can be recompiled or otherwise combined so that the content of each document is combined into a new document that can be included within the documentation system.

It should be appreciated that if no help documents are located responsive to the user query, e.g., the query result indicates that no matching help documents from the documentation system were located, then a result indicating that no matching help documents were found can be stored within the usage information 145 as the query result.

Control 230, within GUI 200 can receive a user input specifying a user rating of the documentation. The user rating can be specific to the query result returned responsive to a user query or can be specific to a particular help document in the query result, e.g., the help document currently selected and being displayed. In any case, the user rating, whether input as a text input or selected from a plurality of predefined options, may be stored as part of the usage information within each respective entry when the user does specify such information.

Figure 3A:
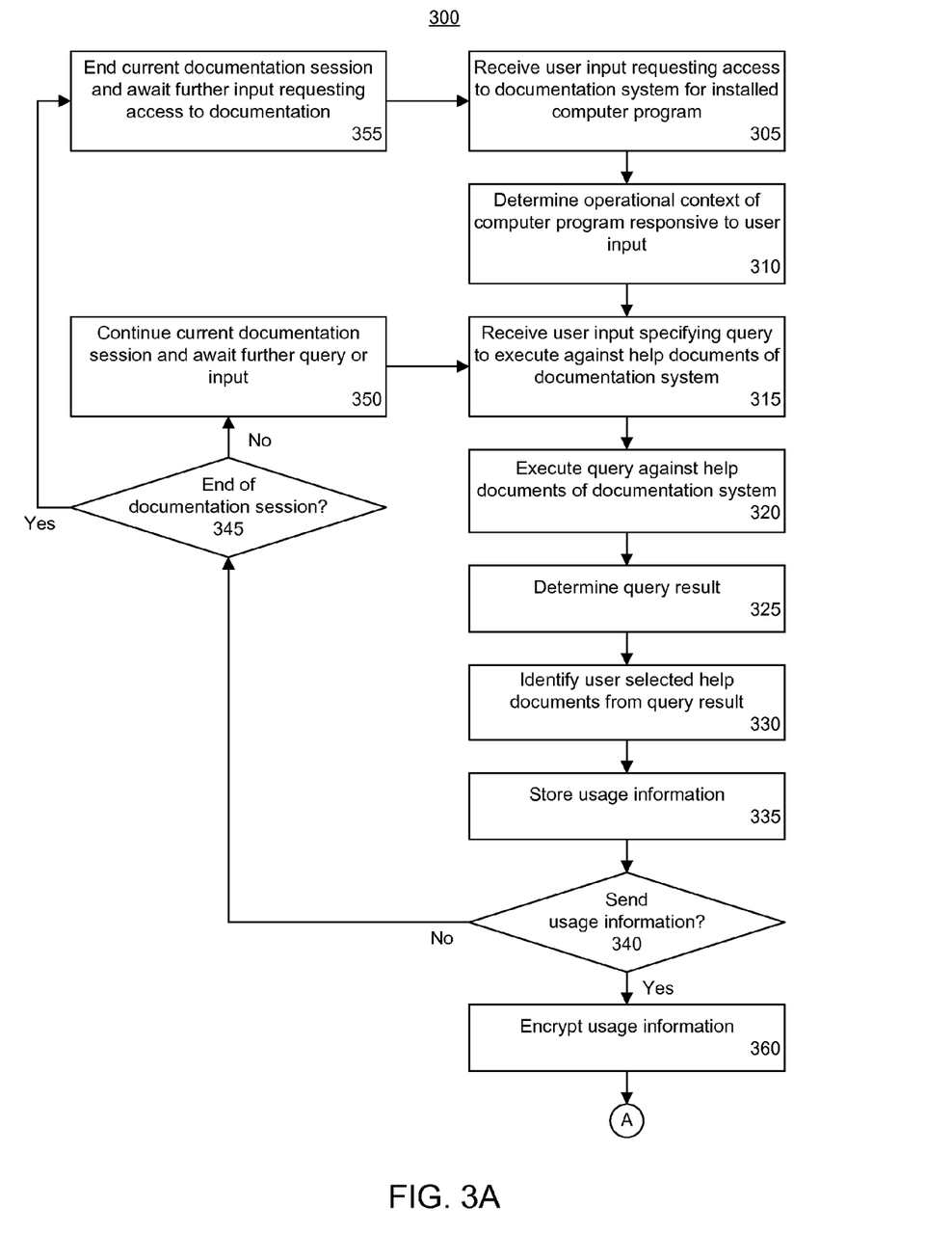
FIGS. 3A and 3B, taken collectively, form a flow chart illustrating a method of updating an installed computer program in accordance with another embodiment of the present invention.
Figure 3B:
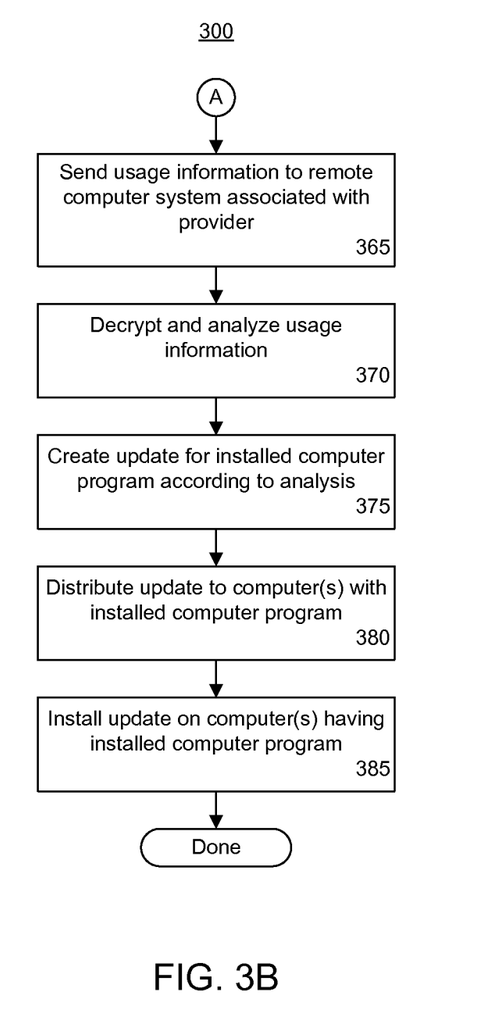

FIGS. 3A and 3B, taken collectively, form a flow chart illustrating a method 300 of updating an installed program in accordance with another embodiment of the present invention. Method 300 can be implemented using a system such as the system described with reference to FIGS. 1 and 2. Method 300 can begin in a state in which a program and the documentation system for that program, e.g., the help system, are installed on a computer. Further, a user can be executing the program.

Accordingly, in step 305, a user input requesting access to the documentation system for the installed program can be received. The user input requesting access to the documentation system can initiate or begin a documentation session, e.g., a help session, for the program. In step 310, the operational context of the program can be determined responsive to the user input requesting access to the documentation system. The operational context can indicate the operational state of the program, e.g., which user interface screen is being displayed when the user input is received, which functions of the program may be active or have been executed, which files may be open within the environment of the program, the type of files that are being accessed, one or more prior user inputs, etc.

In step 315, a further user input can be received specifying a query to be executed against the content of the documentation system, e.g., the help documents. The query may be specified in the form of freestyle text, a Boolean search, a keyword search, or the like. As noted, in one embodiment, the query can be formatted in a language other than the language in which the help documents are implemented. In step 320, the query specified by the user input can be executed against the help documents of the documentation system. When the query is specified in a different language, the terms of the query can be correlated against various help documents and/or aliases in the documentation system. In step 325, a query result can be determined. The query result may be displayed to the user via a display device. As noted, operational context of the program also may be determined when a user specified query is executed.

The query result can indicate the particular help documents of the documentation system that match the query from the user. If no help document is found to match the query, then the query result can indicate that no matching help documents were found. In step 330, any help documents, or portions thereof, selected for viewing from within the query result by the user can be identified. In step 335, usage information can be stored. As noted, the usage information can include, but is not limited to, the query or any portion thereof, the query result, the operational context of the program, and any user selected help documents, or portions of help documents, from the query result. Usage information further can include a user request for context sensitive help, any help documents returned as a result of that request, and/or user selected help documents from among those help documents returned responsive to the request for context sensitive help. In step 340, a determination can be made as to whether the usage information should be sent to a remote computer associated with the provider of the program. If so, the method can proceed to step 360. If not, the method can continue to step 345.

The determination as to whether the usage information, which, as noted, may be formatted into an electronic document, will be sent can be made based upon any of a variety of different criteria. In one example, the usage information can be sent periodically, e.g., at predetermined intervals. In another example, the usage information can be sent periodically, but only at an interval when the electronic document includes a minimum number of entries or reaches a particular size. As noted, the usage information also can be sent manually.

In another example, the usage information may be sent from time to time. For instance, the usage information may be sent only when, and immediately in response to, the usage information including a minimum number of entries or reaching a particular size.

In still another example, the usage information can be sent responsive to a detected programmatic event. For instance, the usage information may be sent in response to a user closing a project within the program, e.g., a document being worked upon within the program being closed, or responsive to the user closing the program. In either case, the usage information may not be sent if no new entries have been added since the last occurrence of the usage information being sent.

Continuing with step 345, in the case where the usage information is not to be sent, a determination can be made as to whether the current documentation session has ended. The program can determine whether the user has terminated access to the documentation system, e.g., closed the help viewer or help function, closed a help document, etc. If so, the method can continue to step 355. If not, the method can proceed to step 350.

In step 350, the current documentation session, e.g., the current help session, can continue and the program can monitor and await further user input specifying a query to be performed against the help documents of the documentation system. After, step 350, for example, responsive to a user input specifying a further query, the method can loop back to step 315 to continue processing. In step 355, the current documentation session can end. In that case, program execution can continue. The program can monitor for and await a subsequent user input requesting access to the documentation system.

Continuing with step 360, where the usage information is to be sent, the usage information can optionally be encrypted. In step 365, the usage information, in encrypted form, can be sent to the remotely located computer associated with the provider of the program. Once the usage information is provided to the provider of the program, in step 370, the usage information can be decrypted and analyzed. The analysis of the usage information can be performed automatically, e.g., using a computer-based analysis system of the provider, manually, or using a combination of both automatic and manual analysis techniques. The analysis may also include aggregating usage information collected from multiple users at the same or different locations.

In one aspect, for each entry in the usage information, the query can be compared with the query result for that query. For example, search terms of a query that yields a query result including no help documents, e.g., a query result specifying an empty set, can be automatically identified. It may be the case, for example, that a user is familiar with a trade name of a function, product, or process rather than the actual, technical name or the trade name used by the provider of the program. In such cases, it can be beneficial to identify those terms and create aliases within the alias files of the documentation system. The aliases map terms not found within the help documents to synonyms or terms of similar meaning that exist within the help documents. An alias also may map terms not found within the help documents directly with help documents or portions of particular help documents, for example, those portions of help documents that include terms of the same or similar meaning as the search term not found within the help documents.

Other examples of processing that may be applied to the query results can include automatically identifying search terms used more than a minimum number of times, whether such search terms returned a search result with help documents or without, or search terms that are used by more than a minimum number of users, as the system described herein can be implemented across a plurality of computers executing the program so that the provider of the program receives usage information for each respective user having a computer with the installed program. Help documents accessed more than others, e.g., the top "N" help documents where "N" is an integer less than the total number of help documents within the documentation system, or more than a threshold number of times can be automatically identified, whether returned responsive to a user query, whether or not a request for context sensitive help.

Another example of a processing technique that can be applied to the usage information is to identify any search terms of queries, e.g., excluding Boolean operators, etc., that are not included within the help documents. In that case, an alias can be created for each such search term that links the search term with another term that is included within one or more help documents. The term included within the help documents can be of the same or similar meaning as the term that is not included within the help documents. An alias also can be created for each such search term that links the search term with a particular help document or portion of a particular help document, for example, a help document that includes a term of similar or the same meaning as noted.

Using the time stamp information, instances where a query was executed and search results were located, but in which a subsequent query was executed within a predetermined period of time can be identified automatically. In those cases, where the predetermined period of time is small, e.g., less than a minute, less than 30 seconds, or the like, the time between consecutive queries can indicate that the first query, whether or not the query result included any help documents, was not effective or did not yield the information desired by the user. Such may be the case despite any user selection of a help document for viewing from the query result. As noted, time stamp information also can be used to determine whether selected help documents should be combined or presented together as a single unit in consequence of their routinely or frequently being viewed within a predetermined amount of time of one another.

In another embodiment, within the documentation system of the program, a control can be provided that allows a user to indicate, on a per query or per help document basis, whether the documentation system was helpful. Activation of the control can be time stamped so that the provider may determine when the control was activated, e.g., when viewing a particular help document of the query result.

In step 375, an update for the program can be created according to the analysis of the usage information. In one embodiment, the update for the program may be created automatically, though this need not be the case. The update may be a new or improved query execution or search functionality to be included in the program, updated content, e.g., updated or new individual help documents, one or more new or updated alias files, or the like.

In step 380, the update can be distributed to computer(s) having the program installed. In one aspect, the update can be sent automatically when available or published by the provider to different computers having the program installed. In another aspect, the program can execute within the user's computer and check with a server of the provider periodically or from time to time and download an update when available. In either case, the update can be sent from the computer of the provider to individual user computers having the program installed. Alternatively, as noted, the update may be downloaded by the individual user computers. In step 385, the computer(s) having the installed program can execute the update, thereby installing the update and implementing the improvements to the program on each computer.

The flowchart in the figures illustrates the architecture, functionality, and operation of possible implementations of systems, methods and computer program products according to various embodiments of the present invention. In this regard, each block in the flowchart may represent a module, segment, or portion of code, which comprises one or more portions of computer-usable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and computer instructions.

Embodiments of the present invention can be realized in hardware, software, or a combination of hardware and software. The embodiments can be realized in a centralized fashion in one computer or in a distributed fashion where different elements are spread across several interconnected computers. Any kind of computer or other apparatus adapted for carrying out the methods described herein is suited. A typical combination of hardware and software can be a general-purpose computer with a program that, when being loaded and executed, controls the computer such that it carries out the methods described herein.

Embodiments of the present invention further can be embedded in a computer program product, which comprises all the features enabling the implementation of the methods described herein. The computer program product can include a computer-usable or computer-readable medium having computer-usable program code which, when loaded in a computer, causes the computer to perform the functions described herein. Examples of computer-usable or computer-readable media can include, but are not limited to, optical media, magnetic media, computer memory, one or more portions of a network through which computer-usable program code can be propagated, or the like.

The terms "computer program," "software," "application," "computer-usable program code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, although not necessarily directly, and not necessarily mechanically, e.g., communicatively linked through a communication channel or pathway or another component or system.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A method, comprising:
    determining an operational state of an installed computer program while the computer program executes responsive to a first user input requesting access to a documentation system of the computer program;
    subsequent to the first user input, receiving a second user input specifying a query against help documents of the documentation system of the installed computer program during execution of the computer program;
    executing, within a computer system in which the computer program is installed, the query against the help documents of the documentation system;
    responsive to determining a query result, storing usage information for the documentation system within computer memory of the computer system, wherein the usage information comprises at least one entry, wherein the at least one entry comprises at least a portion of the query and the query result, thereby specifying an association between the query and the query result;
    wherein storing the usage information comprises storing an indication of each help document of the query result that is selected by the user for viewing, and the determined operational state of the installed computer program as part of the entry;
    automatically sending the usage information to a remote computer system affiliated with a provider of the installed computer program; and
    receiving an update to the documentation system;
    wherein the update is created at least in part according to the usage information and wherein the update combines at least two help documents viewed by the user within a predetermined amount of time of one another into a single help document.

2. The method of claim 1, further comprising:
    receiving the usage information within the remote computer system; and
    distributing an update, created at least in part according to the usage information.

3. The method of claim 1, wherein the operational state indicates a user interface of the computer program displayed as the first user input is received.

4. The method of claim 1, wherein the operational state of the computer program indicates at least one function of the computer program that is active.

5. The method of claim 1, wherein the operational state of the computer program indicates a file that is open within the computer program.

6. The method of claim 1, wherein storing usage information comprises:
    storing an indication of each of a plurality of help documents of the query result selected by the user for viewing.

7. The method of claim 1, further comprising:
    storing an indication of at least one help document selected by the user for viewing not returned as part of the query result.

8. A computer-program product comprising: a non-transitory computer-usable medium comprising computer-usable program code that updates an installed computer program, the computer-usable medium comprising:
    computer-usable program code that determines an operational state of an installed computer program while the computer program executes responsive to a first user input requesting access to a documentation system of the computer program;
    computer-usable program code that, subsequent to the first user input, receives a second user input specifying a query against help documents of the documentation system of the installed computer program during execution of the computer program;
    computer-usable program code that executes the query against the help documents;
    computer-usable program code that, responsive to determining a query result, stores usage information for the documentation system within computer memory of a computer system, wherein the usage information comprises at least one entry, wherein the at least one entry comprises at least a portion of the query and the query result, thereby specifying an association between the query and the query result;
    wherein the computer-usable program code that stores the usage information comprises computer-usable program code that stores an indication of each help document of the query result that is selected by the user for viewing and the determined operational state of the installed computer program as part of the entry;
    computer-usable program code that sends the usage information to a remote computer system affiliated with a provider of the installed computer program; and
    computer-usable program code that receives an update to the documentation system;
    wherein the update is created at least in part according to the usage information and wherein the update combines at least two help documents viewed by the user within a predetermined amount of time of one another into a single help document.

9. The computer-program product of claim 8, wherein the computer-usable medium further comprises:
    computer-usable program code that receives the entries within the remote computer system; and
    computer-usable program code that distributes an update, created at least in part according to the usage information.

10. The computer-program product of claim 8, wherein the operational state indicates a user interface of the computer program displayed as the first user input is received.

11. The computer-program product of claim 8, wherein the operational state of the computer program indicates at least one of a function of the computer program that is active or a file that is open within the computer program.

12. The computer-program product of claim 8, wherein storing the usage information comprises:
    storing an indication of each of a plurality of help documents of the query result selected by the user for viewing.

13. The computer-program product of claim 8, further comprising:
    storing an indication of at least one help document selected by the user for viewing not returned as part of the query result.

14. A system, comprising:
    a processor programmed to initiate executable operations comprising:
    determining an operational state of an installed computer program while the computer program executes responsive to a first user input requesting access to a documentation system of the computer program;
    subsequent to the first user input, receiving a second user input specifying a query against help documents of the documentation system of the installed computer program during execution of the computer program;

executing, using the processor, the query against the help documents of the documentation system;

responsive to determining a query result, storing usage information for the documentation system within a memory of the system wherein the usage information comprises at least one entry, wherein the at least one entry comprises at least a portion of the query and the query result, thereby specifying an association between the query and the query result;

wherein the usage information comprises an indication of each help document of the query result that is selected by the user for viewing and the determined operational state of the installed computer program as part of the entry;

automatically sending the usage information to a different system affiliated with a provider of the installed computer program; and receiving receive an update to the documentation system;

wherein the update is created at least in part according to the usage information and wherein the update combines at least two help documents viewed by the user within a predetermined amount of time of one another into a single help document.

15. The system of claim 14, further comprising:

storing an indication of at least one help document selected by the user for viewing not returned as part of the query result.

16. The system of claim 14, wherein storing the usage information comprises:

storing an indication of each of a plurality of help documents of the query result selected by the user for viewing.

\* \* \* \* \*